(12) United States Patent
Shimozono

(10) Patent No.: US 8,584,734 B2
(45) Date of Patent: Nov. 19, 2013

(54) TWO MATERIAL PHASE CHANGE ENERGY STORAGE SYSTEM

(75) Inventor: Gary Shimozono, Kapolei, HI (US)

(73) Assignee: Navatek, Ltd, Honolulu, HI (US)

( * ) Notice: Subject to any disclaimer, the term of this patent is extended or adjusted under 35 U.S.C. 154(b) by 1133 days.

(21) Appl. No.: 12/368,653

(22) Filed: Feb. 10, 2009

(65) Prior Publication Data

US 2009/0199998 A1 Aug. 13, 2009

Related U.S. Application Data

(60) Provisional application No. 61/027,630, filed on Feb. 11, 2008.

(51) Int. Cl.
*F28D 20/00* (2006.01)

(52) U.S. Cl.
USPC .................. 165/10; 165/104.14; 165/104.15; 165/104.17

(58) Field of Classification Search
USPC .............. 165/58, 61, 64, 65, 104.13, 104.14, 165/104.15, 104.17, 104.21, 140, 272, 4, 165/9.1, 9.4, 10, 104.11, 104.16, 165/104.18–104.2, 104.23, 185, 901, 902
See application file for complete search history.

(56) References Cited

U.S. PATENT DOCUMENTS

| | | | |
|---|---|---|---|
| 2,153,942 A * | 4/1939 | Spalding, Jr. .................. | 165/285 |
| 3,273,634 A * | 9/1966 | Snelling .................... | 165/104.21 |
| 3,780,356 A * | 12/1973 | Laing .............................. | 257/714 |
| 3,848,416 A | 11/1974 | Bundy | |
| 3,859,501 A * | 1/1975 | Matys ........................... | 219/553 |
| 3,866,424 A * | 2/1975 | Busey .......................... | 60/644.1 |
| 4,040,566 A | 8/1977 | Chiarelli | |
| 4,071,079 A * | 1/1978 | Engelbrecht ................. | 165/48.1 |
| 4,127,161 A | 11/1978 | Clyne et al. | |
| 4,146,057 A * | 3/1979 | Friedman et al. ........ | 165/104.14 |
| 4,222,365 A * | 9/1980 | Thomson ..................... | 126/400 |
| 4,246,466 A * | 1/1981 | Rice et al. ..................... | 392/341 |
| 4,291,756 A | 9/1981 | Bracht | |
| 4,294,227 A | 10/1981 | Kreibich | |
| 4,397,152 A * | 8/1983 | Smith ........................ | 60/641.15 |
| 4,466,478 A | 8/1984 | Carlsson et al. | |
| 4,535,837 A | 8/1985 | Ishii et al. | |
| 4,657,067 A * | 4/1987 | Rapp et al. ...................... | 165/10 |
| 4,696,338 A | 9/1987 | Jensen et al. | |
| 4,708,812 A * | 11/1987 | Hatfield .......................... | 252/70 |
| 4,976,308 A * | 12/1990 | Faghri ............................ | 165/10 |
| 5,269,145 A | 12/1993 | Krause et al. | |
| 5,507,337 A * | 4/1996 | Rafalovich et al. ............. | 165/63 |
| 5,685,289 A | 11/1997 | Yogev | |
| 5,687,706 A * | 11/1997 | Goswami et al. ........ | 126/263.01 |

(Continued)

*Primary Examiner* — Leonard R Leo
(74) *Attorney, Agent, or Firm* — Fitzpatrick, Cella, Harper & Scinto

(57) ABSTRACT

An energy storage and transfer system and method includes the use of a containment vessel holding a first solid/liquid phase change heat transfer medium and at least one second containment vessel located at least partially within the first phase change heat transfer medium and holding a second solid/liquid phase change medium. The second phase change heat transfer medium is heated from an external source of energy and gives up its absorbed heat to the first phase change heat transfer medium. A heat exchange loop is partially contained within the first phase change heat transfer medium for removing energy therefrom and transferring it to an external source for use. The second phase change heat transfer material has a higher melting temperature and higher heat of fusion value than the first phase change heat transfer material.

9 Claims, 4 Drawing Sheets

Dual Medium Power Storage and Recovery

(56) References Cited

U.S. PATENT DOCUMENTS

| | | | |
|---|---|---|---|
| 5,873,250 A * | 2/1999 | Lewis et al. | 60/650 |
| 6,044,200 A * | 3/2000 | Hirdes | 392/341 |
| 6,105,659 A * | 8/2000 | Pocol et al. | 165/10 |
| 6,116,330 A * | 9/2000 | Salyer | 165/48.2 |
| 6,203,764 B1 * | 3/2001 | Benson | 422/179 |
| 6,701,914 B2 * | 3/2004 | Schwarz | 126/400 |
| 6,772,823 B2 * | 8/2004 | Hirano | 165/10 |
| 7,225,860 B2 * | 6/2007 | Baginski et al. | 165/10 |
| 2001/0028791 A1 * | 10/2001 | Salyer | 392/341 |
| 2007/0209365 A1 * | 9/2007 | Hamer et al. | 60/648 |

* cited by examiner

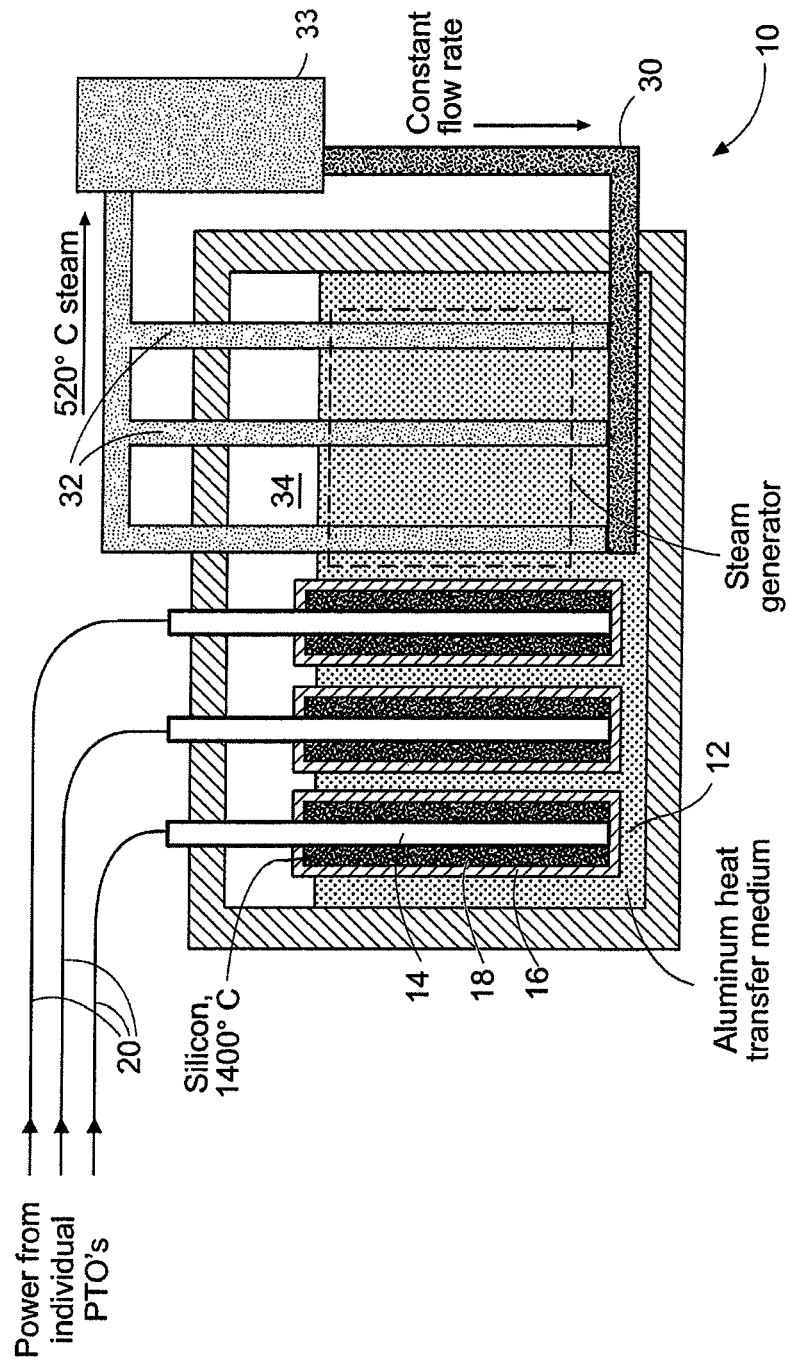
FIG. 1 Dual Medium Power Storage and Recovery

FIG. 2A

*Energy storage device using two or more phase change materials*

Concept: Use two materials (or more) to store and dispense thermal energy

- One material is the primary energy storage medium
- The second material primarily for heat transfer

Condition at design conditions

Silicon
- Temperature – 1450 deg C
- Mass - 64 ltons
- Volume - 900 ft^3
- Stored energy - 42 Mw-hrs
- ~material cost - $110 K Aluminum
- Temperature – 1450 deg C
- Mass - 39 ltons
- Volume - 600 ft^3 (guessed)
- Stored energy - 14 Mw-hrs
- ~material cost - $90 K Total stored energy - 56 Mw-hr

FIG. 2B

FIG. 2C

Silicon

| | | |
|---|---|---|
| heat of fusion | 430 Cal/g | |
| | 774 BTU/lbm | |
| initial temp | 1450 deg C | Si volume 900 ft^3 |
| melt temp | 1400 deg C | density 2.57 g/cc |
| final temp | 660 deg C | 453.7 g/lbm |
| | | 28317 cc/ft^3 |
| Cp liquid | 0.217 cal/g/deg C | |
| Cp solid | 0.17 cal/g/deg C | 160.4 lbm/ft^3 |
| energy in phase change | 111736498 BTU | 144362.4 lbm |
| | 32728 Kw-hr | |
| | 32.7 Mw-hr | 64.4 lton |
| energy in temp diff. | | |
| deg C 1400  660 | 9557 Kw-hr | |
| | 9.6 Mw-hr | |
| Total stored energy in AL | 42.28 | |

Aluminum

| | | |
|---|---|---|
| heat of fusion | 95 Cal/g | |
| | 171 BTU/lbm | |
| initial temp | 1450 deg C | Al volume 600 ft^3 |
| Cp | 0.26 cal/g/deg C | 2.34 specific gravity at 1450 deg F, 788 deg C |
| | 0.00396 BTU/Cal | mass 87609.6 lbm |
| | 453.7 g/lbm | 39.11 lton |
| | 0.0002929 Kw-hr/BTU | |
| | 0.0001368 Kw-hr/lbm/deg C | melting temp 660 deg C |
| | 12.0 Kw-hr/deg C | |
| energy stored in melted AL | | |
| Deg C 660 1450 | 9470 Kw-hr | |
| | 9.5 Mw-hr | |
| energy stored in phase change | 14981242 BTU | |
| | 4388 Kw-hr | |
| | 4.39 Mw-hr | |
| Total stored energy in AL | 13.86 | |

TWO MATERIAL PHASE CHANGE ENERGY STORAGE SYSTEM

BACKGROUND OF THE INVENTION

In the continuing search for efficient energy production and alternative energy sources, the use of various devices which will generate heat or electricity from waves or wind is continuously increasing. The problem with such systems is that the generation of energy thereby is not continuous. Often the energy is generated during periods of low demand and therefore must be stored. The storage of such energy has become of critical importance due to the costs involved. On the other hand, the delivery of energy when needed must be on a continuous and constant rate basis.

It is of course desirable that the storage of energy in such circumstances should not lead to significant losses, which frequently occur when energy is repeatedly converted from one form to another.

The utilization of phase change materials and the latent heat of fusion for storage of energy to meet these demands is well-known. However, the need for efficient systems of this type continues and expands.

FIELD OF THE INVENTION

The present invention relates to the storage of thermal energy from an external heating source and the supply of stored energy to an external device.

BRIEF DESCRIPTION OF THE INVENTION

It is an object of the present invention to provide a method and system for storing energy in the form of thermal energy from a non-continuous supply source and providing the same to an end user on a relatively continuous basis. Another object of the present invention is to provide such a method and system which is efficient in operation and relatively inexpensive to manufacture.

In accordance with an aspect of the present invention high density energy storage is accomplished by the use of two phase change materials. One of these materials will provide for the primary thermal energy storage through phase change and the second material will aid in the recovery of the energy back for use, for example in a steam turbine. The two materials are selected to optimize their primary functions, i.e., energy storage and heat transfer.

Although the primary function of the system is to facilitate energy recovery, it also provides overall energy storage for use as needed. This allows for tailoring of the system to more easily accommodate the requirements of the energy recovery system, e.g., a steam turbine.

In accordance with one aspect of the invention silicon is used as the primary energy storage medium and aluminum is used as the heat transfer medium. Energy from an external source, such as, for example, a windmill or wave energy converter is used to heat and melt the silicon thus storing the energy thermally in the silicon. Silicon has a heat of fusion of 430 calories/gm which is high when compared to most material. It additionally has a relatively low melting temperature of 1,455° C. This silicon is segregated from the other material, in this case aluminum, and releases heat to the aluminum through a contact surface area of an insulated chamber. The rate of release of heat to the aluminum is controlled by the size of the contact surface area.

After prolonged storage the temperature of the silicon and the aluminum will equalize at a temperature that is higher than the melting temperature of the silicon. Recovery of the stored energy is accomplished by integrating a heat exchanger in the heat transfer medium, i.e., in the aluminum.

The heat exchanger could be a steam/water loop including a steam turbine generator which uses water pumped through the heat exchanger in the aluminum.

At initial startup of the system water in the steam water loop would be directed through a reduced portion of the heat exchanger. As the temperature of heat transfer medium decreases the water would be directed through increasing portions of the heat exchanger to ensure proper absorption of heat. As the heat transfer medium temperature further decreases this approach allows the condition of the supply steam to the turbine to remain constant. It will also allow the heat stored in the liquid aluminum to be extracted as it solidifies.

For steam turbines that operate at 500° C. aluminum is a good heat transfer medium because it has high thermal conductivity and a melting temperature of 660° C. The heat exchanger system would be designed to make use of the aluminum as a phase change energy storage medium in addition to the silicon. The silicon is more cost effective since its heat of fusion is 4.5 times higher than aluminum and is it also less expensive. However, a heat transfer medium such as aluminum is necessary because it offers high thermal conductivity, relatively high heat of fusion and is relatively inexpensive. The use of this dual medium approach offers energy storage at a higher energy density and energy recovery at temperatures compatible with existing commercials steel turbines.

The above, and other objects, features and advantages of the invention will be apparent to those skill in the art from the following detailed description of an illustrative embodiment thereof and read in connection with the accompanying drawings:

FIG. 1 is a schematic diagram of a system in accordance with present invention; and FIG. 2 is a multi-page chart of the parameters of the system.

Referring now to the drawing in detail, initially to FIG. 1, an insulated containment vessel 10 incorporating the system of the present invention is illustrated which contains a supply of a first liquid solid phase change material 12, in this case aluminum.

One or more silicon carbide heaters 14 are embedded in the aluminum in secondary containment vessels 16 formed of known insulating materials. Each of these containment vessels 16 holds a the supply of silicon 18 as the second liquid/solid phase change material.

The silicon carbide heaters are connected by power cables 20 or the like to an external source of power such as for example devices which generate electricity from wind turbines or wave generating devices. The electrical power is converted to thermal energy in the silicon carbide heaters which are of known construction. The heat discharged by the silicon carbide heaters is absorbed in the silicon contained in the containment vessels 16 and raises the temperature thereof through phase change. It is to be understood that the heaters used to heat the silicon liquid/solid phase change material may be heaters other than silicon carbide heaters, e.g., electrical resistance heaters, thermal energy heaters or the like.

The heat absorbed by the silicon is transferred through the insulating vessel 16 to the aluminum 12. The amount of heat transferred is determined by the amount of surface area and number of the silicon carbide heaters contained in the system. The aluminum is continuously heated by the silicon through its solid/liquid phase change temperature, thereby storing and absorbing heat while the silicon continues to give up heat.

A steam water loop system 30 includes a heat exchanger area 32 embedded in the vessel 10 and particularly in the aluminum body 12. Suitable controls can be provided to vary the amount or size of the heat exchanger area containing water flow in order to control the removal of heat from the system. The heat exchanger is connected to a conventional steam turbine 33 and heat is withdrawn as required by the system.

The containment vessel 10 can be designed using known techniques to induce convection currents in the aluminum body 12 to avoid stratification of the heat transfer medium and to maintain a consistent thermal profile throughout the system. This will avoid transient hot or cold spots in the system. In addition this approach eliminates the need for mechanical mixers or pumps which would have to operate in an extremely hostile environment.

When the system is approaching an extended state of heat the aluminum solidifies and managing the water flow through the heat exchanger using appropriate controls will control the amount of heat recovery. As the temperature of the aluminum reduces the maximum heat exchanger area will be used during this phase.

The aluminum does not fully fill the containment vessel 10, and an unfilled open area 34 is provided above its level. The atmosphere in this area 34 of the containment vessel preferably is an inert gas which will minimize oxidation of the materials in the vessel.

Although silicon and aluminum are the preferred materials to be used in accordance with the present invention, other materials having melting points and heat suffusion similar to aluminum and silicon as described above could also be used.

Although the present invention has been described with regard to the preferred embodiment thereof, it is to be understood that various changes and modifications may be effected therein without departing from the scope or spirit of this invention.

What is claimed is:

1. An energy storage and transfer system comprising:
a first containment vessel holding a first solid/liquid phase change heat transfer medium;
at least one second containment vessel located at least partially within said first solid/liquid phase change heat transfer medium and holding a second solid/liquid phase change heat transfer medium;
means in said second containment vessel for providing energy from an external source for heating said second solid/liquid phase change heat transfer medium to a temperature sufficient to cause said second solid/liquid phase change heat transfer medium in said at least one second containment vessel to change from its solid phase to its liquid phase and store energy, whereby said second solid/liquid phase change heat transfer medium will transfer heat to said first solid/liquid phase change heat transfer medium in said first containment vessel to cause said first solid/liquid phase change heat transfer medium therein to change from its solid phase to its liquid phase; and
heat transfer means in said first solid/liquid phase change heat transfer medium for removing thermal energy from said first solid/liquid phase change heat transfer medium and transferring it to an external unit for use thereby,
said second solid/liquid phase change heat transfer medium having a higher melting temperature and a higher heat of fusion value than that of said first solid/liquid phase change heat transfer medium and transfers heat to said first solid/liquid phase change heat transfer medium,
said first solid/liquid phase change heat transfer medium being selected for having higher thermal conductivity than that of said second solid/liquid phase change heat transfer medium for efficient transfer of thermal energy to said heat transfer means, and
said first solid/liquid phase change heat transfer medium is aluminum and said second solid/liquid phase change heat transfer medium is silicon.

2. An energy storage and transfer system as defined in claim 1 wherein said means for providing energy from an external source comprises a silicon carbide heater.

3. An energy storage and transfer system as defined in claim 2 wherein said heat transfer means is a steam/water loop and the external unit is a steam turbine.

4. An energy storage and transfer system as defined in claim 1 wherein thermal energy is not transferred directly from said second solid/liquid phase change heat transfer medium to any external unit.

5. An energy storage and transfer system as defined in claim 1 wherein thermal energy is transferred to any external unit through said first solid/liquid phase change heat transfer medium.

6. A method for storing and transferring energy comprising the steps of:
providing a first solid/liquid phase change heat transfer medium and a second solid/liquid phase change heat transfer medium;
heating said second solid/liquid phase change heat transfer medium to a temperature sufficient to cause said second solid/liquid phase change heat transfer medium to change from its solid phase to its liquid phase and store energy using energy from an external source, said second solid/liquid phase change heat transfer medium contained at least partially within said first solid/liquid phase change heat transfer medium and having a higher melting temperature and heat of fusion value than that of said first solid/liquid phase change heat transfer medium;
transferring heat from said second solid/liquid phase change heat transfer medium to said first solid/liquid phase change heat transfer medium to cause said first solid/liquid phase change heat transfer medium to change from its solid phase to its liquid phase; and
extracting thermal energy from said first solid/liquid phase change heat transfer medium while said first solid/liquid phase change heat transfer medium continues to absorb heat from said second solid/liquid phase change heat transfer medium,
wherein said first solid/liquid phase change heat transfer medium has a higher thermal conductivity than that of said second solid/liquid phase change heat transfer medium for efficient transfer of thermal energy to heat transfer means for transferring the thermal energy to an external unit, and
said first solid/liquid phase change heat transfer medium is aluminum and said second solid/liquid phase change heat transfer medium is silicon.

7. A method as defined in claim 6 wherein said heating step comprises supplying heat to said second solid/liquid phase change heat transfer medium through use of a silicon carbide heater.

8. A method as defined in claim 6 wherein thermal energy is not transferred directly from said second solid/liquid phase change heat transfer medium to any external unit.

9. A method as defined in claim 6 wherein thermal energy is transferred to any external unit through said first solid/liquid phase change heat transfer medium.

* * * * *